(12) United States Patent
Toyota et al.

(10) Patent No.: US 10,654,241 B2
(45) Date of Patent: May 19, 2020

(54) PAPER MATERIAL FOR FIBROUS CASING, PRODUCTION METHOD THEREOF, AND FIBROUS CASING

(71) Applicants: DAIO PAPER CORPORATION, Shikokuchuo-shi, Ehime (JP); OCI CO., LTD., Kobe-shi, Hyogo (JP)

(72) Inventors: Jyunya Toyota, Shikokuchuo (JP); Yoshihisa Okamura, Kobe (JP); Katsuhiko Yamada, Kobe (JP)

(73) Assignees: DAIO PAPER CORPORATION, Shikokuchuo-shi (JP); OCI CO., LTD., Kobe-shi (JP)

( * ) Notice: Subject to any disclaimer, the term of this patent is extended or adjusted under 35 U.S.C. 154(b) by 258 days.

(21) Appl. No.: 15/323,861

(22) PCT Filed: Jun. 29, 2015

(86) PCT No.: PCT/JP2015/068744
§ 371 (c)(1),
(2) Date: Jan. 4, 2017

(87) PCT Pub. No.: WO2016/006493
PCT Pub. Date: Jan. 14, 2016

(65) Prior Publication Data
US 2017/0142988 A1 May 25, 2017

(30) Foreign Application Priority Data

Jul. 8, 2014 (JP) ................... 2014-140849
Apr. 8, 2015 (JP) ................... 2015-079622
Apr. 8, 2015 (JP) ................... 2015-079634

(51) Int. Cl.
*B32B 1/08* (2006.01)
*B32B 27/10* (2006.01)
(Continued)

(52) U.S. Cl.
CPC ............... *B32B 1/08* (2013.01); *A22C 13/00* (2013.01); *B32B 1/02* (2013.01); *B32B 27/10* (2013.01);
(Continued)

(58) Field of Classification Search
CPC .. B32B 1/02; B32B 1/08; B32B 27/10; B32B 27/12; B32B 27/16; B32B 27/20; B32B 29/02; B32B 29/04; B32B 29/06
See application file for complete search history.

(56) References Cited

U.S. PATENT DOCUMENTS 3,904,806 A   9/1975  Waggoner
5,213,858 A   5/1993  Tanner et al.
(Continued)

FOREIGN PATENT DOCUMENTS

JP   6-312494 A    11/1994
JP   2000-116365 A  4/2000
(Continued)

OTHER PUBLICATIONS

Extended European Search Report dated Feb. 8, 2018, issued in counterpart European Application No. 15818984.5. (8 pages).
(Continued)

*Primary Examiner* — Walter Aughenbaugh
(74) *Attorney, Agent, or Firm* — Westerman, Hattori, Daniels & Adrian, LLP

(57) ABSTRACT

Provided are a paper material for fibrous casing enabling a fibrous casing to deliver favorable performance, a production method thereof, and a fibrous casing employing the paper material for fibrous casing. The paper material for fibrous casing of the present invention is used as a food packaging material in heat processing of a foodstuff, and is formed from pulp as a principal component, with one face being a glossy face and another face being a matte face. The
(Continued)

fibrous casing of the present invention comprises: a paper layer that is arranged as an innermost layer and formed from a paper material; and a synthetic resin layer that is overlaid on an outer face of the paper layer, the paper material being the paper material for fibrous casing. The matte face of the paper material is preferably directed inward. The glossy face of the paper material is also preferably directed inward.

20 Claims, 2 Drawing Sheets

(51) Int. Cl.
| | | |
|---|---|---|
| | *B32B 27/16* | (2006.01) |
| | *B32B 29/02* | (2006.01) |
| | *B32B 27/12* | (2006.01) |
| | *B32B 27/20* | (2006.01) |
| | *B32B 1/02* | (2006.01) |
| | *B32B 29/04* | (2006.01) |
| | *B32B 29/06* | (2006.01) |
| | *A22C 13/00* | (2006.01) |

(52) U.S. Cl.
CPC .............. *B32B 27/12* (2013.01); *B32B 27/16* (2013.01); *B32B 27/20* (2013.01); *B32B 29/02* (2013.01); *B32B 29/04* (2013.01); *B32B 29/06* (2013.01)

(56) References Cited

U.S. PATENT DOCUMENTS

| | | | |
|---|---|---|---|
| 6,200,613 | B1 | 3/2001 | Schafer et al. |
| 2002/0176973 | A1* | 11/2002 | Keiser ...................... B32B 7/06 428/212 |
| 2003/0180487 | A1 | 9/2003 | Reighard et al. |
| 2005/0112247 | A1* | 5/2005 | Stalberg ............. A22C 13/0013 426/135 |
| 2005/0129813 | A1 | 6/2005 | Koenig et al. |

FOREIGN PATENT DOCUMENTS

| | | |
|---|---|---|
| JP | 2005089867 A | 4/2005 |
| JP | 2008-99563 A | 5/2008 |
| JP | 2015-1037 A | 1/2015 |

OTHER PUBLICATIONS

International Search Report dated Oct. 6, 2015, issued in counterpart of International Application No. PCT/JP2015/068744 (2 pages).
Office Action dated Mar. 14, 2019, issued in counterpart AU Application No. 2015288875. (3 pages).
Office Action dated Jul. 25, 2019, issued in counterpart AU Application No. 2015288875 (5 pages).

* cited by examiner

PAPER MATERIAL FOR FIBROUS CASING, PRODUCTION METHOD THEREOF, AND FIBROUS CASING

TECHNICAL FIELD

The present invention relates to a paper material for fibrous casing, a production method thereof, and a fibrous casing.

BACKGROUND ART

Conventionally, a fibrous casing for packaging a processed meat product such as ham and sausage has been known. As such a fibrous casing, a fibrous casing provided with an inner layer comprising pulp as a principal component and an outer layer overlaid on an outer face side of the inner layer has been known. Such a fibrous casing having the inner layer and the outer layer is able to retain a food modifier such as a smoke solution, a seasoning, a colorant, a preservative and the like in the inner layer, and to transfer these components to a filling during cooking and the like.

As such a fibrous casing having an inner layer and an outer layer, for example, a packaging material comprising paper (inner layer) and a heat-sealable nonwoven fabric (outer layer) being laminated has been proposed (refer to Japanese Unexamined Patent Application, Publication No. H6-312494). The packaging material is formed by layering the paper and the nonwoven fabric and then impregnating them with a viscose solution. In such a packaging material, the viscose solution is able not only to bond the paper with the nonwoven fabric, but also to coat the paper, whereby peelability of the paper from the filling is improved.

However, such a conventional fibrous casing which employs the viscose solution as described above is costly and requires a complex production procedure.

In light of suppression of cost and simplification of the production steps, it may be contemplated not to employ the viscose solution. However, in the conventional fibrous casing, vinylon-added rayon paper or chemical fiber-blended paper are used as the paper. Therefore, in the case of these types of paper not being coated by viscose, vinylon may leak out from the rayon paper upon heating and attach to the filling. In the case of the chemical fiber-blended paper, a binder fiber may be fused and leak upon heating and attach to the filling. Furthermore, employing paper in the inner layer may cause inconveniences such as uneven transfer of the food modifier to a foodstuff and inferior adhesiveness between the inner layer (paper layer) and the outer layer (synthetic resin layer) leading to interlayer delamination during use.

Moreover, fibrous casing is required: to retain a sufficient amount of the food modifier within the inner layer; to have a function of efficiently transferring, i.e., releasing the food modifier toward a packaged foodstuff; to be superior in peelablility from the filling; not to attach a minute unwanted substance derived from the inner layer onto the filling; and the like. However, in the case of employing normal paper in the inner layer, liquid retention and releaseabilty, peelability from the filling, prevention of the minute unwanted substance derived from the inner layer from attaching onto the filling, and the like are insufficient. Given the above, a fibrous casing which is superior in these performances is desired to be developed.

PRIOR ART DOCUMENTS

Patent Documents

Patent Document 1: Japanese Unexamined Patent Application, Publication No. H6-312494

SUMMARY OF THE INVENTION

Problems to be Solved by the Invention

The present invention has been made in view of the above described circumstances and an object of the present invention is to provide a paper material for fibrous casing that enables a fibrous casing to deliver favorable performance, a production method thereof, and a fibrous casing employing the paper material for fibrous casing.

Means for Solving the Problems

The paper material for fibrous casing according to an aspect of the present invention made for attaining the aforementioned object is a paper material for fibrous casing that is used as a food packaging material in heat processing of a foodstuff, characterized in that the paper material is formed from pulp as a principal component, and that one face is a glossy face and another face is a matte face.

The paper material for fibrous casing comprises pulp as a principal component, one face thereof being a glossy face and another face thereof being a matte face. In the case of using the paper material with the matte face being on an inner side in contact with the foodstuff, a surface area in contact with the foodstuff is great. Accordingly, a fibrous casing employing the paper material for fibrous casing provides superior releaseability, i.e., transferability to the foodstuff, of the food modifier having penetrated thereinto. In this case, on an outer side is the glossy face on which pulp fibers are bonded to each other with few voids. As a result, penetration of the food modifier from the inner side of the fibrous casing is not allowed to reach the vicinity of the outer face of the paper material, whereby the releaseability of the food modifier toward the inner side is improved. Furthermore, since the glossy face is on the outer side of the paper material, for example in the case of overlaying a synthetic resin layer onto the outer side by means of extrusion lamination, a resin forming the synthetic resin layer is less likely to penetrate into the paper material. Therefore, the paper material for fibrous casing enables a paper layer to secure a sufficient thickness for a portion with voids even in a laminated state with the synthetic resin layer, whereby liquid retention is improved.

In addition, in a case of being used with the glossy face inside to be in contact with a filling, the paper material for fibrous casing inhibits pulp from sticking to the filling such as a foodstuff, whereby peelability from the filling is improved. Furthermore, in this case, the matte face is on the outer side, whereby adhesiveness is improved in a case of overlaying a shrink film (synthetic resin layer), etc. onto the outer side.

It is preferred that an amount of water absorption of the glossy face measured by Bristow's method with a contact time of 20 seconds is no less than 20 ml/m² and no greater than 40 ml/m²; and the amount of water absorption of the matte face is no less than 10 ml/m² and no greater than 35 ml/m², the amount of water absorption of the glossy face measured by Bristow's method with a contact time of 20 seconds being greater than that of the matte face. This permits sufficient penetration and preferred transfer of the food modifier, etc., and further improves peelability from the filling.

It is preferred that an arithmetic average roughness Ra of the glossy face is no less than 0.5 μm and no greater than 3 μm, and an arithmetic average roughness Ra of the matte face is no less than 3 μm and no greater than 6 μm. This preferably improves: peelability from the filling and resin impenetrability of the glossy face; adhesiveness with a shrink film, etc. and releaseability of the food modifier of the matte face; and the like.

It is preferred that an absolute value of a fiber orientation angle of the glossy face is no less than 0° and no greater than 3°; and an absolute value of a fiber orientation angle of the matte face is no less than 0.5° and no greater than 4°, the absolute value of the fiber orientation angle of the glossy face being smaller than the absolute value of the fiber orientation angle of the matte face. This enables dense and uniform arrangement of fiber oriented on the glossy face, in turn uniform penetration of the food modifier, etc. and further suppression of uneven transfer, as well as improved peelability, liquid retention, and the like.

In addition, the production method of a paper material for fibrous casing according to the present invention made for attaining the aforementioned object is a production method of a paper material for fibrous casing that is used as a food packaging material in heat processing of a foodstuff, comprising: dewatering a pulp slurry; and drying with a Yankee dryer one face side of pulp having been obtained by dewatering the pulp slurry, wherein a face in contact with the Yankee dryer is formed as a gloss face and a face not in contact with the Yankee dryer is formed as a matte face. Subsequent to the drying with a Yankee dryer, planarizing with calender equipment may be further provided.

The production method of a paper material for fibrous casing enables suitable production of the paper material for fibrous casing having the aforementioned features.

The fibrous casing according to the present invention made for attaining the aforementioned object is a fibrous casing that is used as a food packaging material in heat processing of a foodstuff, characterized by comprising a paper layer that is arranged as an innermost layer and formed from a paper material and a synthetic resin layer that is overlaid on an outer face of the paper layer, the paper material being the paper material for fibrous casing.

It is preferred that the matte face of the paper material is directed inward. In this case, a surface area of the inner face of the paper layer in contact with the foodstuff is great, and therefore releaseability, i.e., transferability to the foodstuff, of the food modifier with which the paper layer has been impregnated is superior. Furthermore, on the outer side of the paper material (paper layer) is the glossy face, where pulp fibers are bonded to each other with few voids. As a result, penetration of the food modifier is not allowed to reach the vicinity of an outer side face of the paper layer, whereby the releaseability of the food modifier toward the inner side is further improved. Moreover, since the glossy face is on the outer side of the paper material, for example in the case of overlaying the paper layer with a synthetic resin layer by means of extrusion lamination, a resin forming the synthetic resin layer is less likely to penetrate into the paper layer. Therefore, the fibrous casing enables the paper layer to secure a sufficient thickness for a portion with voids even in a laminated state with the synthetic resin layer, whereby liquid retention is improved.

It is preferred that the glossy face of the paper material is directed inward. This inhibits pulp from sticking to the foodstuff, which is the filling, whereby peelability from the foodstuff is improved. In addition, the glossy face being in contact with the foodstuff enables uniform and homogeneous transfer of the food modifier to the foodstuff. Meanwhile, the matte face is on the outer side of the paper material forming a paper layer in contact with the synthetic resin layer, whereby adhesiveness between the paper layer and the synthetic resin layer is superior by virtue of an anchoring effect.

It is preferred that the synthetic resin layer comprises an oxygen barrier resin layer having an oxygen barrier property and a water vapor barrier resin layer having a water vapor barrier property. The synthetic resin layer thus comprising the oxygen barrier resin layer and the water vapor barrier resin layer enables effective cooking of the foodstuff and effective transfer of the food modifier to the foodstuff during the cooking. Nylon is preferred as a resin forming the oxygen barrier resin layer. Polyethylene is preferred as a resin forming the water vapor barrier resin layer.

An innermost layer of the synthetic resin layer is preferably the water vapor barrier resin layer. In this case, it is preferred that the synthetic resin layer is overlaid on the outer face of the paper layer by means of extrusion lamination of polyethylene which forms the water vapor barrier resin layer as the innermost layer of the synthetic resin layer. By thus overlaying the synthetic resin layer onto the paper layer by means of extrusion lamination employing polyethylene which is a thermoplastic resin, a part of the polyethylene efficiently penetrates into the paper material forming the paper layer, thereby enabling further improvement of adhesiveness and the like.

It is preferred that the paper layer comprises the food modifier with which the paper material has been impregnated, the food modifier including a colorant, a flavoring, or a combination thereof. By impregnating the paper material with such a food modifier in advance, a color and a flavor may be given to the foodstuff during heat processing.

It is to be noted that "fibrous casing" as referred to means a casing that enables, in a state in which a foodstuff such as a processed meat product is packaged therein, transfer of a food modifier such as a smoke solution, a seasoning, a colorant, a preservative and the like with which a paper material thereof has been impregnated, to the foodstuff by means of heat processing such as smoke processing. A principal component as referred to means a component that has the greatest proportion among all components. A "glossy face" as referred to means a face that has glossiness and of which an arithmetic average roughness Ra is no greater than 3 μm. A "matte face" as referred to means a face that does not have glossiness and of which an arithmetic average roughness Ra is no less than 3 μm. Presence of glossiness is determined by observation of appearance with human eye. The presence of glossiness is a relative indicator and a face with higher glossiness is determined to be the glossy face and a face with less glossiness is determined to be the matte face. The "arithmetic average roughness Ra" as referred to means a value measured in accordance with JIS-B-0601 (2001), with a cut-off λc being 2.5 mm and an evaluation length being 12.5 mm. "Fiber orientation angle" as referred to means an average fiber arrangement direction, represented by a value calculated with respect to a machine direction of a paper machine being 0°. "Having an oxygen barrier property" as referred to means, for example, having an oxygen transmission rate at 20° C. and 90% RH being no greater than 100 cc/m$^2$·24 hr·atm. "Having a water vapor barrier property" as referred to means, for example, having a water vapor transmission rate at 40° C. and 90% RH being no greater than 50 g/m²·24 hr.

Effects of the Invention

As explained in the foregoing, the paper material for fibrous casing according to an aspect of the present invention enables a fibrous casing to deliver favorable performance. In addition, the fibrous casing according to the present invention is able to deliver favorable performance.

DESCRIPTION OF EMBODIMENTS

Hereinafter, embodiments of the paper material for fibrous casing, the production method thereof, and the fibrous casing according to the present invention are described in detail with reference to the drawings as appropriate.

<Paper Material for Fibrous Casing>

Figure 1:
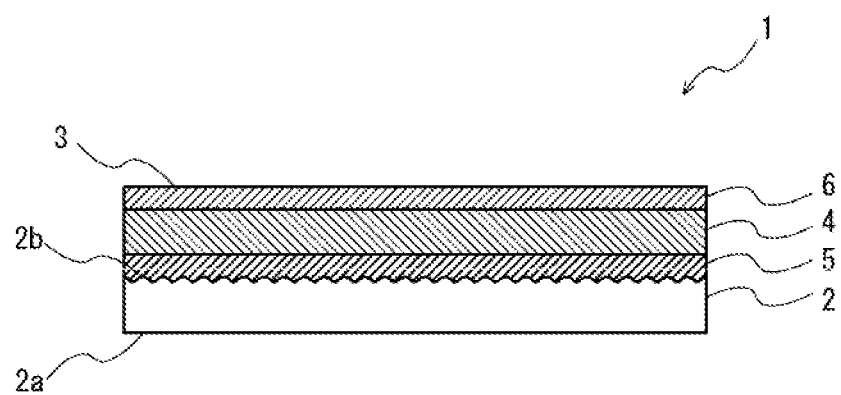
FIG. 1 is a cross sectional view of a fibrous casing according to an embodiment of the present invention.

The paper material for fibrous casing (hereinafter, may be also referred to as "paper material") is a paper material for fibrous casing that is used as a food packaging material in heat processing of a foodstuff, characterized in that the paper material is formed from pulp (preferably natural pulp) as a principal component, and that one face is a glossy face and another face is a matte face. A fibrous casing comprising a paper material for fibrous casing as an embodiment of the present invention is illustrated in FIG. 1. A fibrous casing 1 of FIG. 1 comprises a paper layer 2 that is arranged as an innermost layer and a synthetic resin layer 3 that is overlaid on an outer face of the paper layer 2. The fibrous casing 1 is used as a packaging material for a foodstuff in heat processing of the foodstuff. In the fibrous casing 1, the paper layer 2 is composed of the paper material.

The content of pulp (preferably natural pulp) in the paper material is generally no less than 50% by mass, preferably no less than 90% by mass, and more preferably no less than 95% by mass. It is to be noted that in the fibrous casing 1 of FIG. 1, an inner face 2a of the paper material (paper layer 2) is a glossy face and an outer face 2b is a matte face.

The paper material is generally obtained by papermaking using a pulp slurry containing natural pulp.

The natural pulp is not particularly limited and examples thereof include: waste paper pulp; chemical pulp; mechanical wood pulp; pulp obtained from sisal, abaca, sugarcane, cotton, silk, bamboo, and kenaf; and the like. Of these, needle-leaved tree bleached kraft pulp (NBKP) is preferred as the natural pulp. By employing needle-leaved tree bleached kraft pulp (NBKP) as the natural pulp, strength of the paper material for fibrous casing is increased, and a void ratio of the paper material is increased by virtue of a great fiber diameter and a great fiber length. In addition, hydrophilicity of needle-leaved tree bleached kraft pulp (NBKP) enables, synergistically with the aforementioned effects, the food modifier, etc. to sufficiently penetrate.

Alternatively, as the natural pulp, it is also preferred to use needle-leaved tree bleached kraft pulp (NBKP) in combination with mercerized pulp, which is obtained by mercerizing needle-leaved tree bleached kraft pulp (NBKP). Using the mercerized pulp in combination with needle-leaved tree bleached kraft pulp (NBKP) can facilitate reduction in density of the paper material and permit the food modifier, etc. to penetrate further suitably. The lower limit of the content ratio by mass of the needle-leaved tree bleached kraft pulp (NBKP) to the mercerized pulp is preferably 4:1 and more preferably 14:3. Meanwhile, the upper limit of the content ratio by mass of the needle-leaved tree bleached kraft pulp (NBKP) to the mercerized pulp is preferably 9:1 and more preferably 18:3. The content ratio by mass of the needle-leaved tree bleached kraft pulp (NBKP) to the mercerized pulp falling within the above range can suitably improve characteristics of absorbing, retaining, releasing, separating, etc. the food modifier, etc. while improving strength.

The lower limit of the content of the natural pulp in the entire fiber component forming the paper material is for example 50% by mass, preferably 70% by mass, more preferably 90% by mass, further more preferably 95% by mass, yet more preferably 97% by mass, and particularly preferably 100% by mass. When the content of the natural pulp component in the entire fiber component falls within the above range, the paper material is able to inhibit uneven transfer of the food modifier, etc.

The lower limit of freeness of the natural pulp is preferably 350 ml, more preferably 400 ml, and further more preferably 430 ml. Meanwhile, the upper limit of freeness of the natural pulp is preferably 550 ml, more preferably 500 ml, and further more preferably 460 ml. The abovementioned freeness of the natural pulp may be adjusted either by means of well-known beating equipment, or by blending a plurality of kinds of natural pulp having different freeness. In the case of the freeness of the natural pulp being less than the above lower limit, liquid absorbability, liquid separability, etc., may be decreased due to excessive density. To the contrary, in the case of the freeness of the natural pulp being greater than the above upper limit, heat-retaining properties and thermal insulation properties may be decreased due to reduced air permeance. It is to be noted that "freeness" as referred to means a value measured in accordance with JIS-P-8121 (2012).

Examples of a fiber component other than the natural pulp in the fiber components composing the paper material include: rayon fiber; polyolefin fiber; polyester fiber; various other synthetic resin fibers; and the like. These may be used either alone or in a mixture of two or more types thereof.

It is preferred that the paper material contains a paper strengthening agent as an additive. Examples of the paper strengthening agent include a wet paper strengthening agent and a dry paper strengthening agent.

Examples of the wet paper strengthening agent include a polyamide-epichlorohydrin resin, a urea resin, an acid colloid-melamine resin, thermal crosslinkability-imparted PAM, and the like. The lower limit of the content of the wet paper strengthening agent (in terms of solid content equivalent) in the entire pulp components or in the entire fiber components being 100 parts by mass is preferably 0.5 parts by mass, more preferably 1.5 parts by mass, and further more preferably 2 parts by mass. The upper limit of the content of the wet paper strengthening agent (in terms of solid content equivalent) in the entire pulp components or in the entire fiber components being 100 parts by mass is preferably 6 parts by mass, more preferably 5.5 parts by mass, and further more preferably 5 parts by mass. In the case of the content of the wet paper strengthening agent being less than the lower limit, the peelability from the filling may not be sufficiently improved. To the contrary, in the case of the content of the wet paper strengthening agent being greater than the upper limit, liquid absorbability may be decreased.

Examples of the dry paper strengthening agent include cationic starch, amphoteric starch, polyacrylamide (PAM), carboxy methyl cellulose (CMC), and the like. The lower limit of the content of the dry paper strengthening agent (in terms of solid content equivalent) in the entire pulp components or in the entire fiber components being 100 parts by mass is preferably 0.2 parts by mass, more preferably 0.5 parts by mass, and further more preferably 1 parts by mass. The upper limit of the content of the dry paper strengthening agent (in terms of solid content equivalent) in the entire pulp components or in the entire fiber components being 100 parts by mass is preferably 5.5 parts by mass, more preferably 5 parts by mass, and further more preferably 4.5 parts by mass. In the case of the content of the dry paper strengthening agent being less than the lower limit, peelability from the filling (foodstuff) may not be sufficiently improved. To the contrary, in the case of the content of the dry paper strengthening agent being greater than the upper limit, liquid absorbability may be decreased.

In addition, it is preferred that the paper material contains a sizing agent as an additive. With the sizing agent being contained, the paper material is less likely to absorb moisture, whereby heat-retaining properties, thermal insulation properties and the like may be improved. Examples of the sizing agent include: a rosin-based sizing agent; alkyl ketene dimer (AKD); alkenyl succinic anhydride (ASA); various types of emulsion sizing agents; starch; and the like. Of these, the rosin-based sizing agent is preferred, which provides a superior effect of imparting water resistance and is able to improve smoothness of the glossy face in the case of forming one face of the paper material to be the glossy face.

Examples of the rosin-based sizing agent include modified rosin, reinforced rosin, saponified rosin, emulsified rosin, and the like. Of these, saponified rosin is more preferred which provides a sufficient sizing effect and is superior in dilutability to the pulp slurry.

The lower limit of the content of the sizing agent (in terms of solid content equivalent) in the entire pulp components or in the entire fiber components being 100 parts by mass is preferably 1 parts by mass, more preferably 1.5 parts by mass, and further more preferably 1.7 parts by mass. On the other hand, the upper limit of the content of the sizing agent (in terms of solid content equivalent) in the entire pulp components or in the entire fiber components being 100 parts by mass is preferably 3 parts by mass, more preferably 2.5 parts by mass, and further more preferably 2.3 parts by mass. In the case of the content of the sizing agent being less than the lower limit, heat-retaining properties and thermal insulation properties may not be sufficiently improved. To the contrary, in the case of the content of the sizing agent being greater than the upper limit, surface properties, in turn operability, of the paper material may be decreased.

The paper material may contain other additives within a range not leading to impairment of the effects of the present invention. Examples of the other additives include: a paper strengthening agent other than those mentioned above; a loading material such as talc, calcium carbonate, kaolin, titanium dioxide, hydrated silicon, hydrated silicic acid (white carbon), urea-formalin polymer fine particles, reclaimed particles, and silica composite reclaimed particles; a coagulant such as aluminum sulfate and polyethylene imine; a flocculant such as polyacrylamide and a copolymer thereof; a charge agent; a defoaming agent; a dispersant; and the like.

The paper material is formed as one-side glazed paper with one face being the glossy face and another face being the matte face.

The lower limit of an amount of water absorption of the glossy face measured by Bristow's method with a contact time of 20 seconds is preferably 20 ml/m$^2$, more preferably 22 ml/m$^2$, and further more preferably 25 ml/m$^2$. Meanwhile, the upper limit of an amount of water absorption of the glossy face measured by Bristow's method with a contact time of 20 seconds is preferably 40 ml/m$^2$, more preferably 38 ml/m$^2$, and further more preferably 35 ml/m$^2$. In addition, the lower limit of an amount of water absorption of the matte face measured by Bristow's method with a contact time of 20 seconds is preferably 10 ml/m$^2$, more preferably 12 ml/m$^2$, and further more preferably 15 ml/m. Meanwhile, the upper limit of an amount of water absorption of the matte face measured by Bristow's method with a contact time of 20 seconds is preferably 35 ml/m, more preferably 33 ml/m$^2$, and further more preferably 30 ml/m$^2$. Furthermore, it is preferred that the amount of water absorption of the glossy face measured by Bristow's method with a contact time of 20 seconds is greater than that of the matte face. With the amounts of water absorption of the glossy face and of the matte face measured by Bristow's method with a contact time of 20 seconds falling within the above ranges, the paper material permits sufficient penetration and preferred transfer of the food modifier, etc., and further improves peelability from the foodstuff.

The lower limit of the arithmetic average roughness Ra of the glossy face, which is the inner face 2a, is preferably 0.1 μm, more preferably 0.2 μm, and further more preferably 0.5 μm. Moreover, the lower limit of the arithmetic average roughness Ra of the glossy face is preferably 1 μm, and more preferably 1.5 μm. Meanwhile, the upper limit of the arithmetic average roughness Ra of the glossy face, which is the inner face 2a, is 3 μm, preferably 2.5 μm, more preferably 2 μm, and further more preferably 1 μm. With the arithmetic average roughness Ra of the glossy face, which is the inner face 2a, falling within the above range, peelability from the foodstuff and transfer uniformity of the food modifier can be improved. In the case of the arithmetic average roughness Ra of the inner face 2a being greater than the upper limit, pulp fiber is more likely to stick to the foodstuff, whereby peelability is decreased. In addition, transfer of the food modifier to the foodstuff is more likely to be uneven. In the case of the arithmetic average roughness Ra of the inner face 2a being less than the lower limit, releaseability of the food modifier, etc. having penetrated tends to be inferior.

The lower limit of the arithmetic average roughness Ra of the matte face, which is the outer face 2b, is 3 μm, preferably 3.5 μm, and more preferably 4 μm. Meanwhile, the upper limit of the arithmetic average roughness Ra of the matte face, which is the outer face 2b, is preferably 10 μm, more preferably 8 μm, further more preferably 6.5 μm, yet more preferably 6 μm, even more preferably 5.5 μm, and particularly preferably 5 μm. With the arithmetic average roughness Ra of the matte face, which is the outer face 2b, falling within the above range, adhesiveness with the synthetic resin layer 3 may be favorable. The arithmetic average roughness Ra of the outer face 2b being less than the lower limit is less likely: to permit a synthetic resin forming the synthetic resin layer 3 to penetrate; and to enable a sufficient anchoring effect, whereby adhesiveness tends to be inferior. To the contrary, in the case of the arithmetic average roughness Ra of the outer face 2b being greater than the upper limit, the food modifier penetrates from the inner face 2a deeply toward the synthetic resin layer 3, whereby releaseability of the food modifier tends to be inferior.

The lower limit of an absolute value of a fiber orientation angle of the glossy face is preferably 0°. Meanwhile, the upper limit of the absolute value of the fiber orientation angle of the glossy face is preferably 3°, more preferably 2.5°, and further more preferably 2°. The lower limit of an absolute value of a fiber orientation angle of the matte face is preferably 0.5°, more preferably 1°, and further more preferably 1.5°. Meanwhile, the upper limit of the absolute value of a fiber orientation angle of the matte face is preferably 4°. It is further preferred that the absolute value of the fiber orientation angle of the glossy face is smaller than the absolute value of the fiber orientation angle of the matte face. In the paper material, with the fiber orientation angle of the glossy face (inner face 2a) and the fiber orientation angle of the matte face (outer face 2b) falling within the above ranges, arrangement of fiber oriented on the glossy face is dense and uniform, whereby peelability from the foodstuff is improved, and adhesiveness of the matte face with the synthetic resin layer 3 can be improved.

It is preferable that the paper material does not contain viscose. In the paper material, since the content of the natural pulp in the entire pulp components falls within the above range as described above, sticking of pulp to the filling is inhibited even in the case without viscose, whereby peelability from the filling is improved. In addition, since the paper material does not contain viscose, reduction of cost is realized and simplification of the production procedure is facilitated.

The lower limit of grammage of the paper material is preferably 14 g/m$^2$, more preferably 15 g/m$^2$, and further more preferably 16 g/m$^2$. Meanwhile, the upper limit of the grammage of the paper material is preferably 30 g/m$^2$, more preferably 28 g/m$^2$, and further more preferably 25 g/m$^2$. In the case of the grammage being less than the lower limit, the paper material has reduced strength and may be more likely to break. To the contrary, in the case of the grammage being greater than the upper limit, the paper material has great rigidity and may be less likely to deform along a shape of the filling. It is to be noted that "grammage" as referred to means a value measured in accordance with JIS-P-8124 (2011).

The lower limit of density of the paper material is preferably 0.25 g/m$^3$ and more preferably 0.3 g/m$^3$. Meanwhile, the upper limit of the density of the paper material is preferably 0.6 g/m$^3$ and more preferably 0.55 g/m$^3$. In the case of the density being less than the lower limit, the paper material has reduced strength and may be more likely to break, and heat-retaining properties and thermal insulation properties may be impaired. To the contrary, in the case of the density being greater than the upper limit, the paper material has great rigidity and may be less likely to deform along a shape of the filling. It is to be noted that "density" as referred to means a value measured in accordance with JIS-P-8118 (2012).

The lower limit of vertical wet tensile strength of the paper material is preferably 0.20 kN/m, more preferably 0.25 kN/m, and further more preferably 0.30 kN/m. In the case of the vertical wet tensile strength being less than the lower limit, the peelability from the filling may not be sufficiently improved.

The lower limit of thickness of the paper material is preferably 30 μm, more preferably 35 μm, and further more preferably 38 μm. Meanwhile, the upper limit of the thickness of the paper material is preferably 75 μm, more preferably 70 μm, and further more preferably 68 μm. In the case of the thickness being less than the lower limit, liquid absorbability and liquid retention may be decreased. To the contrary, In the case of the thickness being greater than the upper limit, liquid separability may be inferior.

<Production Method of Paper Material for Fibrous Casing>

A production method of the paper material comprises: dewatering a pulp slurry (forming); and drying with a Yankee dryer one face side of pulp (pulp after the forming) having been obtained by dewatering the pulp slurry. In the paper material obtained by the production method of the paper material, a face in contact with the Yankee dryer is formed as the glossy face and a face not in contact with the Yankee dryer is formed as the matte face. The production method enables suitable production of the paper material.

More specifically, examples of the production method of the paper material include a method of papermaking from a slurry containing a pulp slurry and various types of additives as needed, by using a conventional paper machine comprising a wire section, a press section, a Yankee dryer, a calender section, etc. Examples of the paper machine may include a conventional wet paper machine such as a fourdrinier paper machine, an on-top former type paper machine, a twin-wire paper machine, a cylinder type paper machine, a tanmo paper machine, and the like. Of these, a cylinder type paper machine is preferred which allows easy adjustment of a fiber orientation angle and is able to improve vertical paper strength. In the case of using a cylinder type paper machine, a face from which water is drained with a wire becomes the matte face and fine fibers are subjected to forced dewatering, whereby releaseability of the matte face can further be improved, which is particularly preferred for obtaining a fibrous casing with the matte face directed inward.

<Fibrous Casing 1>

A fibrous casing 1 of FIG. 1 comprises, as described in the foregoing, the paper layer 2 and the synthetic resin layer 3 that is overlaid on an outer face of the paper layer 2. The fibrous casing 1 is used as a packaging material for a foodstuff in heat processing of the foodstuff. In the fibrous casing 1, the paper layer 2 to be in contact with the foodstuff to be packaged is composed of the paper material. In addition, the inner face 2a of the paper material (paper layer 2) is the glossy face. In other words, the glossy face of the paper material is arranged to be on an inner side (inner face 2a) to be in contact with the foodstuff, which is the filling. As a result, sticking of pulp to the foodstuff is inhibited, whereby peelability from the foodstuff is improved. In addition, since the inner face 2a being in contact with the foodstuff is the glossy face, uniform and homogeneous transfer of the food modifier to the foodstuff is enabled. Meanwhile, the outer face 2b of the paper material forming the paper layer 2 in contact with the synthetic resin layer 3 is the matte face, whereby adhesiveness between the paper layer 2 and the synthetic resin layer 3 is superior by virtue of the anchoring effect.

The paper layer 2 comprises a food modifier with which the paper material has been impregnated. The food modifier gives a color, an aroma, a flavor, etc. to the foodstuff. Examples of the food modifier include a colorant, a flavoring, a preservative, a seasoning, and the like. These may be used either alone or in a mixture of two or more types thereof. Examples of the colorant include a caramel coloring, a gardenia pigment, and the like. Examples of the flavoring include a smoke solution and the like.

The synthetic resin layer 3 has a three-layered structure comprising: an oxygen barrier resin layer 4; a first water vapor barrier resin layer 5 that is overlaid on the inner face of the oxygen barrier resin layer 4; and a second water vapor barrier resin layer 6 that is overlaid on the outer face of the oxygen barrier resin layer 4. With the oxygen barrier resin layer 4, the synthetic resin layer 3 enables effective cooking of the foodstuff and effective transfer of the food modifier to the foodstuff during the cooking. In addition, with the first water vapor barrier resin layer 5 and the second water vapor barrier resin layer 6, the synthetic resin layer 3 enables effective cooking of the foodstuff and effective transfer of the food modifier to the foodstuff during the cooking. These layers improve preservability of the foodstuff as well.

Examples of a resin forming the oxygen barrier resin layer 4 include: a polyolefin such as polyethylene and polypropylene; a thermoplastic resin such as a vinyl chloride resin, a vinylidene chloride resin, polystyrene, polyester, polyamide, nylon (e.g., 6-nylon, 6,6-nylon, etc.); and the like. Of these, nylon is preferred in light of providing a superior oxygen barrier property, superior thermal contraction, and the like. A melting point of the nylon is not particularly limited; however, nylon having a melting point of no less than 215° C. and no greater than 225° C. may be suitably used.

The upper limit of oxygen transmission rate at 20° C. and 90% RH of the oxygen barrier resin layer 4 is preferably 100 cc/m$^2$·24 hr·atm and more preferably 50 cc/m$^2$·24 hr·atm. Meanwhile, the lower limit thereof is preferably a value as close as possible to 0 cc/m$^2$·24 hr·atm, and may be, for example, 1.0 cc/m$^2$·24 hr·atm. In the case of the oxygen transmission rate of the oxygen barrier resin layer 4 falling within the above range, superior food preservation and the like can be provided.

As the oxygen barrier resin layer 4, a thermo-shrinkable film (shrink film) obtained by drawing a film formed from the above-described resin is generally used. A thermal shrinkage temperature of the oxygen barrier resin layer 4 (shrink film) is not particularly limited and may be, for example, no less than 70° C. and no greater than 90° C. The thermal shrinkage temperature falling within the above range permits superior shrinkage during cooking.

An average thickness of the oxygen barrier resin layer 4 is not particularly limited and is preferably, for example, no less than 15 μm and no greater than 50 μm. With such an average thickness, an oxygen barrier property, etc. and processing suitability, etc. can be attained concomitantly.

Examples of a resin forming the first water vapor barrier resin layer 5 and the second water vapor barrier resin layer 6 include: a polyolefin such as polyethylene and polypropylene; and a thermoplastic resin such as polyester. Of these, a polyolefin is preferred and polyethylene is more preferred, in light of providing a superior water vapor barrier property, processability, and the like. Examples of the polyethylene include high density polyethylene (HDPE), low density polyethylene (LDPE), linear low density polyethylene (LLDPE) and the like. A melting point of the polyethylene is not particularly limited; however, nylon having a melting point of no less than 105° C. and no greater than 115° C. may be suitably used. The resin forming the first water vapor barrier resin layer 5 and the resin forming the second water vapor barrier resin layer 6 may be either of the same type or of different types.

Average thicknesses of the first water vapor barrier resin layer 5 and of the second water vapor barrier resin layer 6 are not particularly limited and may be, for example, no less than 15 μm and no greater than 50 μm, respectively. With such an average thickness, a water vapor barrier property, etc. and processing suitability, etc. can be attained concomitantly.

A method of forming the first water vapor barrier resin layer 5 and the second water vapor barrier resin layer 6 is not particularly limited. For example, the water vapor barrier resin layers 5 and 6 may be formed by coating onto the oxygen barrier resin layer 4, or the water vapor barrier resin layers 5 and 6 may be bonded, as single-layer films composed of a water vapor barrier resin, to the oxygen barrier resin layer 4. Alternatively, as described later, the first water vapor barrier resin layer 5 in contact with the paper layer 2 may be formed during extrusion lamination.

An average thickness of the synthetic resin layer 3 is not particularly limited and may be, for example, no less than 30 μm and no greater than 300 μm.

In the fibrous casing 1, the first water vapor barrier layer 5, which is the innermost layer of the synthetic resin layer 3, may penetrate into the paper layer 2 from the outer face side thereof. In such a case, the lower limit of an average thickness of a penetrating portion of the first water vapor barrier layer 5 (innermost layer of the synthetic resin layer 3) is preferably 10%, more preferably 20%, and further more preferably 40% of the average thickness of the paper layer 2. Meanwhile, the upper limit thereof is preferably 90%, more preferably 80%, and further more preferably 60%. The upper limit may also be either 30% or 15%. In the case of the ratio of the penetrating portion being less than the lower limit, adhesion strength between the paper layer 2 and the synthetic resin layer 3 may not be sufficiently obtained. To the contrary, in the case of the ratio of the penetrating portion being greater than the upper limit, the food modifier, etc. may not be able to sufficiently penetrate into the paper layer 2.

<Fibrous Casing 11>

Figure 2:
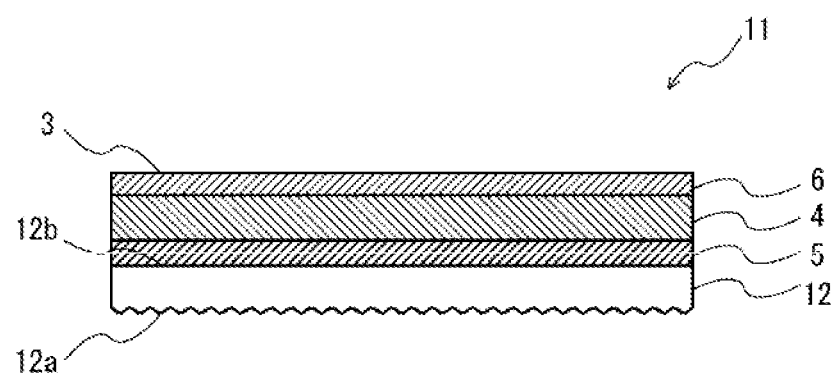
FIG. 2 is a cross sectional view of a fibrous casing that is different from the fibrous casing of FIG. 1.

A fibrous casing 11 of FIG. 2 comprises a paper layer 12 that is arranged as an innermost layer and a synthetic resin layer 3 that is overlaid on an outer face of the paper layer 12.

In a similar manner to the paper layer 2 of the fibrous casing 1 of FIG. 1, the paper layer 12 is formed from a paper material comprising pulp (preferably natural pulp) as a principal component. An inner face 12a of the paper material (paper layer 12) is the matte face, and an outer face 12b is the glossy face. In other words, the matte face of the paper material is arranged to be on an inner side (inner face 12a) to be in contact with the foodstuff, which is the filling.

In the fibrous casing 11, the inner face 12a of the paper material forming the paper layer 12 is the matte face, whereby a surface area of the inner face of the paper layer 12 in contact with the foodstuff is great. As a result, releaseability (transferability) of the food modifier having penetrated into the paper layer 12 to the foodstuff is superior. In addition, the outer face 12b of the paper material (paper layer 12) being the gloss face further increases releaseability toward the inner face side. Furthermore, since the outer face 12b of the paper layer 12 (paper material) is the gloss face, even in the case of the synthetic resin layer being overlaid onto the outer face 12b by means of extrusion lamination or the like, the resin forming the synthetic resin layer 3 is less likely to penetrate into the paper layer 12. As a result, the fibrous casing 11 is able to secure sufficient void in the paper layer 12 and to provide superior liquid retention.

The fibrous casing 11 is identical to the fibrous casing 1 of FIG. 1 except that the paper material forming the paper layer 12 is arranged with the gloss face being directed inward. In a similar manner to the paper layer 2 of FIG. 1, in the paper layer 12, the paper material has been impregnated with the food modifier. As the paper material forming the paper layer 12, the same paper material as the paper layer 2 of FIG. 1 may be used inside out. In other words, specific examples and preferred examples of: types, amounts, physical properties, and the like of the constitutive components of the paper material used for the paper layer 12 of the fibrous casing 11; and a size, physical properties, and the like of the paper material per se, may be the same as those of the paper layer 2 of FIG. 1. However, other ranges, etc. specified below may be preferred for surface roughness, a fiber orientation angle, and the like of each face of the paper material forming the paper layer 12.

The lower limit of the arithmetic average roughness Ra of the matte face, which is the inner face 12a, is 3 μm, preferably 3.5 μm, and more preferably 4 μm. Meanwhile, the upper limit of the arithmetic average roughness Ra of the matte face is preferably 10 μm, more preferably 8 μm, further more preferably 6.5 μm, and particularly preferably 5 μm. With the arithmetic average roughness Ra of the matte face, which is the inner face 12a, falling within the above range, releaseability of the food modifier, etc. can be suitably improved. In the case of the arithmetic average roughness Ra of the matte face, which is the inner face 12a, being less than the lower limit and the matte face being a smooth surface, a surface area thereof is reduced, whereby releaseability of the food modifier, etc. is decreased. In the case of the arithmetic average roughness Ra of the matte face, which is the inner face 12a, being greater than the upper limit, the paper material is more likely to stick to the foodstuff, whereby peelability from the foodstuff is decreased.

The lower limit of the arithmetic average roughness Ra of the glossy face, which is the outer face 12b, is 0.1 μm, preferably 0.5 μm, more preferably 1 μm, and further more preferably 1.5 μm. Meanwhile, the upper limit of the arithmetic average roughness Ra of the glossy face is 3 μm, preferably 2.5 μm, and more preferably 2 μm. With the arithmetic average roughness Ra of the glossy face, which is the outer face 12b, falling within the above range, releaseability of the food modifier toward the inner face side and liquid retention can be improved. In the case of the arithmetic average roughness Ra of the glossy face, which is the outer face 12b, being greater than the upper limit and the glossy face being a rough surface, releaseability, toward the inner face 12a, of the food modifier, etc. having penetrated from a side of the inner face 12a is decreased. In addition, in the case of the arithmetic average roughness Ra of the glossy face, which is the outer face 12b, being greater than the upper limit and the glossy face being a rough surface, an amount of penetration of the resin forming the synthetic resin layer 3 from a side of the outer face 12b is increased, whereby liquid retention (amount of liquid that can be retained) is decreased.

The lower limit of an absolute value of a fiber orientation angle of the glossy face is preferably 0°. Meanwhile, the upper limit of the absolute value of the fiber orientation angle of the glossy face is preferably 3°, more preferably 2.5°, and further more preferably 2°. The lower limit of an absolute value of a fiber orientation angle of the matte face is preferably 0.50, more preferably 1°, and further more preferably 1.5°. Meanwhile, the upper limit of the absolute value of a fiber orientation angle of the matte face is preferably 4. It is further preferred that the absolute value of the fiber orientation angle of the glossy face is smaller than the absolute value of the fiber orientation angle of the matte face. In the paper material, with the fiber orientation angle of the glossy face (outer face 12b) and the fiber orientation angle of the matte face (inner face 12a) falling within the above ranges, arrangement of fiber oriented on the glossy face is dense and uniform, whereby liquid retention and releaseability of the food modifier, etc. from the matte face can be improved.

The synthetic resin layer 3 of the fibrous casing 11 is identical to the synthetic resin layer 3 of the fibrous casing 1 and explanation thereof will be omitted through designating the identical number.

In the fibrous casing 11, the first water vapor barrier layer 5, which is the innermost layer of the synthetic resin layer 3, may penetrate into the paper layer 12 from the outer face side thereof. In such a case, the lower limit of an average thickness of a penetrating portion of the first water vapor barrier layer 5 (innermost layer of the synthetic resin layer 3) is preferably 1%, more preferably 5%, and further more preferably 10% of the average thickness of the paper layer 12. Meanwhile, the upper limit thereof is preferably 70%, more preferably 50%, further more preferably 30%, yet more preferably 20%, and particularly preferably 10%. In the case of the ratio of the penetrating portion being less than the lower limit, adhesion strength between the paper layer 12 and the synthetic resin layer 3 may not be sufficiently obtained. To the contrary, in the case of the ratio of the penetrating portion being greater than the upper limit, the food modifier, etc. may not be able to sufficiently penetrate into the paper layer 12, i.e., liquid retention may be decreased.

<Production Method of Fibrous Casing 1, 11>

A production method of the fibrous casing 1, 11 is not particularly limited; however, efficient production is possible by means of lamination such as dry lamination and extrusion lamination. In the case of production by dry lamination, the production is possible by dry laminating the paper material as the paper layer 2, 12 with a three-layered structure film as the synthetic resin layer 3 being overlaid thereon. In the case of production by extrusion lamination, the paper material as the paper layer 2, 12 and a two-layered structure film composed of the oxygen barrier resin layer 4 and the second water vapor barrier resin layer 6 on an outer side are prepared; and then the paper material and the film are overlaid on one another through extrusion lamination using a thermoplastic resin such as polyethylene (water vapor barrier resin) having been fused. In this case, the polyethylene or the like used for the extrusion lamination forms the first water vapor barrier resin layer 5, which is the innermost layer of the synthetic resin layer 3. Production by the extrusion lamination is able to provide a fibrous casing superior in processability such as printability, bag-making suitability, etc. In addition, the extrusion lamination causes less elution of resin components than in the case of the dry lamination.

It is preferred to, prior to the lamination, subject to the corona treatment a face of the paper material onto which the synthetic resin layer is to be overlaid. The corona treatment is able to improve wettability of the surface and adhesiveness between the paper layer 2, 12 and the synthetic resin layer 3.

Following the lamination, the paper material forming the paper layer 2, 12 is impregnated with the food modifier, to thereby obtain the fibrous casing 1, 11. A procedure for the impregnation with the food modifier is not particularly limited, and may be application, immersion, and the like.

<Other Embodiments>

The paper material for fibrous casing, the production method thereof, and the fibrous casing of the present invention are not limited to the above embodiments. For example, the synthetic resin layer in the fibrous casing is not limited to the three-layered structure. The synthetic resin layer may also be a single layer composed of the oxygen barrier resin layer or the water vapor barrier resin layer, and may have a layered structure with two layers or four or more layers. In addition, in the case of the synthetic resin layer having a plurality of oxygen barrier resin layers or a plurality of water vapor barrier resin layers, the order of lamination of the layers is not particularly limited. However, in light of favorable and concomitant realization of the oxygen barrier property and the water vapor barrier property, alternate lamination of the oxygen barrier resin layer(s) and the water vapor barrier resin layer (s), with a total number of layers being at least three, is preferred.

EXAMPLES

Hereinafter, the present invention will be explained in more detail by way of Examples, but the present invention is not limited to the following Examples.

It is to be noted that measured values in the present Example were obtained according to the following procedures.

<Grammage>

Grammage (g/m$^2$) was measured in accordance with JIS-P-8124 (2011) "Paper and board—Determination of grammage".

<Thickness>

Thickness (μm) was measured in accordance with JIS-P-8118 (1998) "Paper and board—Determination of thickness and density".

<Tensile Strength>

Tensile strength (kN/m) was measured in accordance with JIS-P-8113 (2006).

<Wet Tensile Strength>

Wet tensile strength (kN/m) was measured in accordance with JIS-P-8135 (1998).

<Fiber Orientation Angle>

An absolute value of a fiber orientation angle value measured with an optical orientation tester manufactured by Toyo Seiki Seisaku-sho, Ltd. was obtained as a fiber orientation angle (°).

<Arithmetic Average Roughness Ra>

The arithmetic average roughness Ra (μm) was measured in accordance with JIS-B-0601 (2001), with a cut-off λc being 2.5 mm and an evaluation length being 12.5 mm.

<Water Absorption Amount (Bristow Method)>

A water absorption amount (ml/m$^2$) was measured in accordance with Bristow's method, at a rate of 50.0 mm/s and with a contact time of 20 seconds.

Example 1

A pulp slurry was prepared by adding, to pulp composed of 85% of needle-leaved tree bleached kraft pulp (NBKP) and 15% of mercerized pulp, 3.0 parts by mass of a wet paper strengthening agent in terms of solid content equivalent, with respect to an absolute dry mass of the pulp.

Subsequently, the pulp slurry was subjected to papermaking in a cylinder type paper machine provided with a Yankee dryer, to thereby obtain a paper material for fibrous casing of Example 1. It is to be noted that, as to the paper material for fibrous casing, grammage was 18.3 g/m$^2$, thickness was 40 μm, tensile strength (vertical) was 2.1 kN/m, tensile strength (lateral) was 0.40 kN/m, wet tensile strength was 0.50 kN/m, a fiber orientation angle (gloss face) was 1.5°, a fiber orientation angle (matte face) was 3.8°, an arithmetic average roughness Ra (gloss face) was 1.8 μm, an arithmetic average roughness (matte face) was 4.3 μm, an amount of water absorption (gloss face) was 25 ml/m$^2$, and an amount of water absorption (matte face) was 15 ml/m$^2$.

Examples 2 to 16 and Comparative Examples 1 and 2

Paper materials for fibrous casing of Examples 2 to 16 and of Comparative Examples 1 and 2 were obtained, with pulp types, additives, grammages, and thicknesses as specified in Table 1.

TABLE 1

| | Paper Material for Fibrous Casing | | | | | |
|---|---|---|---|---|---|---|
| | Pulp | | Wet Paper Strengthening Agent (Parts by Mass) | Dry Paper Strengthening Agent (Parts by Mass) | Grammage (g/m$^2$) | Thickness (μm) |
| | Type | Ratio | | | | |
| Example 1 | NBKP/Mercerized Pulp | 85/15 | 3.0 | 3.0 | 18.3 | 40 |
| Example 2 | NBKP/Mercerized Pulp | 85/15 | 4.0 | 3.0 | 24.3 | 46 |
| Example 3 | NBKP/Mercerized Pulp | 85/15 | 3.0 | 3.0 | 15.6 | 35 |
| Example 4 | NBKP/Mercerized Pulp | 85/15 | 6.0 | 3.0 | 18.6 | 38 |
| Example 5 | NBKP/Mercerized Pulp | 85/15 | 1.0 | 0.5 | 19.1 | 42 |
| Example 6 | NBKP/Mercerized Pulp | 80/20 | 0.5 | 0.5 | 17.9 | 40 |
| Example 7 | NBKP/Mercerized Pulp | 90/10 | 3.0 | 1.0 | 18.8 | 38 |
| Example 8 | NBKP/Mercerized Pulp | 85/15 | 3.0 | 5.5 | 19.0 | 38 |
| Example 9 | NBKP/Mercerized Pulp | 85/15 | 3.0 | 3.0 | 14.0 | 30 |
| Example 10 | NBKP/Mercerized Pulp | 85/15 | 3.0 | 3.0 | 28.0 | 50 |
| Example 11 | NBKP/Mercerized Pulp | 85/15 | 3.0 | 3.0 | 30.0 | 53 |
| Example 12 | NBKP | 100 | 3.0 | 3.0 | 17.9 | 35 |
| Example 13 | NBKP/Mercerized Pulp | 75/35 | 3.0 | 3.0 | 18.4 | 51 |

TABLE 1-continued

| | Paper Material for Fibrous Casing | | | | | |
|---|---|---|---|---|---|---|
| Example 14 | NBKP/Mercerized Pulp | 85/15 | 3.0 | 3.0 | 40.1 | 60 |
| Example 15 | NBKP/Mercerized Pulp | 85/15 | Absent | 1.5 | 18.4 | 41 |
| Example 16 | NBKP/Mercerized Pulp | 90/10 | 3.0 | 3.0 | 18.8 | 30 |
| Comparative Example 1 | NBKP/Mercerized Pulp | 85/15 | 1.0 | Absent | 18.3 | 41 |
| Comparative Example 2 | NBKP/Mercerized Pulp | 85/15 | 3.0 | 3.0 | 12.2 | 33 |

| | Tensile Strength (kN/m) | | Wet Tensile Strength (kN/m) | Fiber Orientation Angle (Degree) | | Arithmetic Average Roughness Ra ($\mu$m) | | Amount of Water Absorption (ml/m$^2$) | |
|---|---|---|---|---|---|---|---|---|---|
| | Vertical | Lateral | (Vertical) | Glossy Face | Matte Face | Glossy Face | Matte Face | Glossy Face | Matte Face |
| Example 1 | 2.1 | 0.40 | 0.50 | 1.5 | 3.8 | 1.8 | 4.3 | 25 | 15 |
| Example 2 | 3.0 | 0.60 | 0.90 | 3.0 | 4.0 | 0.5 | 3.0 | 33 | 12 |
| Example 3 | 1.5 | 0.30 | 0.30 | 0.0 | 0.5 | 1.5 | 4.0 | 35 | 20 |
| Example 4 | 2.2 | 0.40 | 0.60 | 1.0 | 4.0 | 2.0 | 5.0 | 30 | 20 |
| Example 5 | 0.9 | 0.20 | 0.20 | 1.5 | 3.3 | 1.8 | 4.8 | 35 | 30 |
| Example 6 | 0.7 | 0.20 | 0.20 | 0.3 | 1.8 | 2.5 | 5.5 | 40 | 35 |
| Example 7 | 1.6 | 0.30 | 0.45 | 2.5 | 3.0 | 1.0 | 3.5 | 33 | 33 |
| Example 8 | 3.4 | 0.60 | 0.55 | 2.0 | 4.0 | 3.0 | 6.0 | 20 | 10 |
| Example 9 | 1.6 | 0.28 | 0.35 | 2.5 | 3.0 | 2.0 | 4.5 | 30 | 25 |
| Example 10 | 3.5 | 0.65 | 0.95 | 2.0 | 2.5 | 3.0 | 5.8 | 40 | 32 |
| Example 11 | 4.5 | 0.80 | 1.10 | 0.8 | 1.5 | 2.7 | 6.0 | 40 | 35 |
| Example 12 | 2.4 | 0.40 | 0.60 | 3.1 | 4.1 | 1.4 | 3.9 | 45 | 40 |
| Example 13 | 1.6 | 0.30 | 0.20 | 0.6 | 0.5 | 3.0 | 3.1 | 25 | 30 |
| Example 14 | 5.6 | 0.90 | 1.50 | 3.5 | 3.5 | 2.5 | 6.1 | 41 | 36 |
| Example 15 | 1.9 | 0.30 | less than 0.1 | 0.0 | 0.5 | 1.5 | 3.9 | 18 | 8 |
| Example 16 | 1.8 | 0.35 | 0.35 | 2.5 | 3.5 | 1.5 | 3.5 | 20 | 18 |
| Comparative Example 1 | 0.8 | 0.20 | 0.10 | 2.0 | 1.8 | 3.1 | 6.5 | 30 | 25 |
| Comparative Example 2 | 1.0 | 0.20 | 0.10 | 1.5 | 2.0 | 0.4 | 2.9 | 8 | 5 |

The paper materials for fibrous casing of Examples 1 to 16 were each formed from pulp as a principal component, with one face being a gloss face, whereby sticking of a synthetic fiber and a binder fiber to a filling, as well as uneven transfer are prevented. Fibrous casings of Comparative Examples 1 and 2 are unable to attain these effects.

Among Examples 1 to 16, particularly, fibrous casings of Examples 1 to 11 each attain effects of: enabling sufficient impregnation with a food modifier by virtue of a great amount of water absorption on the gloss face; and enabling substantially uniform impregnation with the food modifier while preventing the fiber from separating from the paper material (fiber tear-off), and substantially uniform transfer of the food modifier, by virtue of an arithmetic average roughness Ra of the gloss face and an absolute value of the fiber orientation angle being no greater than certain values, and dense and uniform arrangement of fibers on the gloss face.

On the other hand, in the paper materials for fibrous casing of Examples 12 and 14, the gloss face is not sufficiently densely formed and may not accurately inhibit fiber tear-off and uneven transfer. In particular, the paper material for fibrous casing of Comparative Example 1 is not sufficiently densely formed and more prone to fiber tear-off.

In addition, in the paper material for fibrous casing of Example 15, the gloss face does not have a sufficient amount of water absorption and may not be able to secure a sufficient amount of transfer. Furthermore, in a fibrous casing of Comparative Example 2, an amount of water absorption is particularly small and transferability is insufficient.

Moreover, in the paper material for fibrous casing of Example 13, an amount of water absorption of the matte face is greater than an amount of water absorption of the gloss face, and transferability of the food modifier is considered to be somewhat inferior. The paper material for fibrous casing of Example 16 contains more than a predetermined amount of a synthetic fiber and may permit the ultra-fine synthetic fiber to stick to the filling, leading to somewhat inferior peelability.

Example 17

A pulp slurry was prepared by adding, to pulp composed of 85% of needle-leaved tree bleached kraft pulp (NBKP) and 15% of mercerized pulp, 3 parts by mass of a wet paper strengthening agent in terms of solid content equivalent, with respect to an absolute dry mass of the pulp.

Subsequently, the pulp slurry was subjected to papermaking in a cylinder type paper machine provided with a Yankee dryer to thereby obtain a paper material for fibrous casing of Example 17. It is to be noted that, as to the paper material for fibrous casing, grammage was 18.3 g/m$^2$, thickness was 40 $\mu$m, an arithmetic average roughness Ra (gloss face) was 1.8 $\mu$m, and an arithmetic average roughness (matte face) was 4.3 $\mu$m.

Examples 18 to 22 and Comparative Examples 3 and 4

Paper materials of Examples 18 to 22 having thicknesses and surface roughnesses shown in Table 2 were obtained under the same conditions as those for Example 1 except that a papermaking condition and a drying condition were adjusted. In addition, paper materials of Comparative Example 3 and Comparative Example 4, respectively with both faces being glossy faces and both faces being matte faces, were obtained.

The matte face of each paper material (as to Comparative Examples 3 and 4, one face) was subjected to the corona treatment, and a synthetic resin layer having a three-layered structure with: a polyethylene layer as the first water vapor barrier resin layer (15 μm); a nylon layer as the oxygen barrier resin layer (15 μm); and a polyethylene layer as the second water vapor barrier resin layer (20 μm), was overlaid on a side of the treated face by means of extrusion lamination with polyethylene which forms the first water vapor barrier resin layer. Thereafter, the paper material (paper layer) was impregnated with a smoke solution ("Super Smoke 330" available from Kerry Inc.) to thereby obtain a fibrous casing.

For each of the fibrous casings thus obtained, peelability from the foodstuff, uniform transferability to the foodstuff, and adhesiveness between the paper layer and the synthetic resin layer were evaluated by the following methods. The evaluation methods were as follows. Evaluation results are shown in Table 2.

(1) Peelability

A processed meat product was cooked in the fibrous casing and then the fibrous casing was peeled. A surface of the paper layer of the fibrous casing and a surface of the processed meat product to which the food modifier had been transferred were visually observed with a magnifying glass, and scuffing (peelability) was evaluated according to the following criteria:

A: no scuffing observed on surface of paper layer and surface of processed meat product;
B: some scuffing observed on surface of paper layer and surface of processed meat product; and
C: considerable degree of scuffing observed on surface of paper layer and surface of processed meat product.

(2) Uniform Transferability

A processed meat product (foodstuff) in the fibrous casing was cooked in a hot water bath of 80° C. for 1 hour, and then the fibrous casing was peeled. A surface of the paper layer of the fibrous casing and a surface of the foodstuff to which the food modifier had been transferred were visually observed with a magnifying glass, and a transfer state was evaluated according to the following criteria:

A: no smoke solution remaining in paper layer, smoke solution uniformly transferred to foodstuff surface with dark transfer color;
B: little amount of smoke solution remaining in paper layer, smoke solution substantially uniformly transferred to foodstuff surface with light transfer color; and
C: large amount of smoke solution remaining in paper layer, smoke solution hardly transferred to foodstuff surface.

(3) Interlayer Adhesiveness

An inner face (face of the paper layer) of the fibrous casing was pasted to an MDF plywood board with a commercially available wood glue, cut into a piece of 25 mm, and dried at room temperature (20° C.) for one day. Thereafter, strength upon detachment between the paper layer and the synthetic resin layer was measured by a tensile tester ("AG-IS" manufactured by Shimadzu Corporation). Based on the measured value, adhesion strength between the paper material and an overlaid part (synthetic resin layer) was evaluated according to the following criteria:

A: no less than 500 gf/25 mm;
B: no less than 450 gf/25 mm and less than 500 gf/25 mm; and
C: less than 450 gf/25 mm.

TABLE 2

| | Paper Layer (Surface Roughness Ra) | | Feel-ability | Uniform Transfer-ability | Adhe-siveness |
| --- | --- | --- | --- | --- | --- |
| | Inner Face | Outer Face | | | |
| Example 17 | 1.8 (Glossy Face) | 4.3 (Matte Face) | B | B | A |
| Example 18 | 2.8 (Glossy Face) | 5.3 (Matte Face) | B | B | A |
| Example 19 | 0.8 (Glossy Face) | 4.3 (Matte Face) | A | A | A |
| Example 20 | 0.3 (Glossy Face) | 4.3 (Matte Face) | A | A | A |
| Example 21 | 1.8 (Glossy Face) | 6.2 (Matte Face) | B | B | A |
| Example 22 | 1.8 (Glossy Face) | 3.4 (Matte Face) | B | B | B |
| Comparative Example 3 | 1.8 (Glossy Face) | 1.8 (Glossy Face) | B | B | C |
| Comparative Example 4 | 4.3 (Matte Face) | 4.3 (Matte Face) | C | C | A |

As shown in Table 2, the fibrous casings of Examples 17 to 22 were superior in peelability from the foodstuff (A or B), in uniform transferability of the food modifier (A or B), and in interlayer adhesiveness (A or B).

On the other hand, Comparative Example 3 with both faces being the gloss faces was inferior in interlayer adhesiveness. Presumably, this is due to the outer face being the gloss face, which has hindered penetration of the synthetic resin into the paper layer during lamination. Comparative Example 4 of which inner face in contact with the foodstuff was the matte face was poor in peelability and exhibited uneven transfer of the food modifier.

Example 23

A pulp slurry was prepared by adding, to pulp composed of 85% of needle-leaved tree bleached kraft pulp (NBKP) and 15% of mercerized pulp, 3 parts by mass of a wet paper strengthening agent in terms of solid content equivalent, with respect to an absolute dry mass of the pulp.

Subsequently, the pulp slurry was subjected to papermaking in a cylinder type paper machine provided with a Yankee dryer to thereby obtain a paper material for fibrous casing of Example 23. It is to be noted that, as to the paper material for fibrous casing, grammage was 18.3 g/m$^2$, thickness was 40 μm, an arithmetic average roughness Ra (gloss face) was 1.8 μm, and an arithmetic average roughness (matte face) was 4.3 μm.

Examples 24 to 26 and Comparative Examples 5 and 6

Paper materials of Examples 24 to 26 having thicknesses and surface roughnesses shown in Table 3 were obtained under the same conditions as those for Example 23 except that a papermaking condition and a drying condition were adjusted. In addition, paper materials of Comparative Example 5 and Comparative Example 6, respectively with both faces being glossy faces and both faces being matte faces, were obtained.

The matte face of each paper material (as to Comparative Examples 5 and 6, one face) was subjected to the corona treatment, and a synthetic resin layer having a three-layered structure with: a polyethylene layer as the first water vapor barrier resin layer (15 µm); a nylon layer as the oxygen barrier resin layer (15 µm); and a polyethylene layer as the second water vapor barrier resin layer (20 µm), was overlaid on a side of the treated face by means of extrusion lamination with polyethylene which forms the first water vapor barrier resin layer, to thereby obtain a fibrous casing.

For each of the fibrous casings thus obtained, retention (amount retained) and releaseability of the food modifier were evaluated by the following methods. The evaluation methods were as follows. Evaluation results are shown in Table 3.

(1) Amount of Liquid Retained (Liquid Retention)

A desired amount of a smoke solution ("Super Smoke 330" available from Kerry Inc.) was added to the fibrous casing (lay flat width: 135 mm) and the fibrous casing was rewound by a winding machine, under a squeezing pressure of 2 bar and a rate of 30 m/min. An amount of liquid retained was calculated based on mass change per unit area of the fibrous casing, and evaluated according to the following criteria:

A: amount of liquid retained being no less than 13.0 g/m$^2$;
B: amount of liquid retained being no less than 11.0 g/m: and less than 13.0 g/m$^2$; and
C: amount of liquid retained being less than 11.0 g/m$^2$.

(2) Releaseability of Food Modifier (Transferability to Food)

A processed meat product in the fibrous casing, of which paper layer had been impregnated with 11 to 13 g/m$^2$ (actual measured value) of a smoke solution ("Super Smoke 330" available from Kerry Inc.), was cooked in a hot water bath of 80° C. for 1 hour, and then the fibrous casing was peeled. A mass of the fibrous casing prior to impregnation with the smoke solution (M1), a mass of the fibrous casing after impregnation with the smoke solution (M2), and a mass of the fibrous casing after transfer (release) of the smoke solution (M3) were measured, and a release rate of the smoke solution (food modifier) was calculated from these values by the following formula.

Release rate (%)=100×(M2−M3)/(M2−M1)

Releaseability was evaluated according to the following criteria:

A: release rate of no less than 90%;
B: release rate of no less than 50%: and
C: release rate of less than 50%.

TABLE 3

| | Paper Layer (Surface Roughness Ra) | | Liquid | |
|---|---|---|---|---|
| | Inner Face | Outer Face | Retention | Releaseability |
| Example 23 | 4.3 (Matte Face) | 1.8 (Glossy Face) | A | A |
| Example 24 | 3.2 (Matte Face) | 1.8 (Glossy Face) | A | B |
| Example 25 | 5.8 (Matte Face) | 1.8 (Glossy Face) | A | A |
| Example 26 | 4.3 (Matte Face) | 2.8 (Glossy Face) | B | A |
| Comparative Example 5 | 1.8 (Glossy Face) | 1.8 (Glossy Face) | C | C |
| Comparative Example 6 | 4.3 (Matte Face) | 4.3 (Matte Face) | C | C |

As shown in Table 3, the fibrous casings of Examples 23 to 26 were superior in retention and releaseability of the food modifier. It is to be noted that Example 24 was slightly inferior in releaseability to other Examples, presumably due to surface roughness of the inner face (matte face) being slightly lower. Example 25, with high surface roughness of the inner face (matte face), exhibited sufficient releaseability; however, sticking of pulp to the foodstuff was observed after the releaseability evaluation test. Example 26 was slightly inferior in the amount of liquid retained, presumably due to surface roughness of the outer face being somewhat high, which had facilitated penetration of the resin into the paper layer during lamination.

On the other hand, Comparative Example 5, with both faces being the gloss faces, was inferior in an amount of the food modifier retained and releaseability of the food modifier. Presumably, this is due to the both faces being the gloss faces, which have reduced the thickness and the amount of liquid retained, and the inner face being the gloss face, which has reduced the releaseability.

Comparative Example 6, with both faces being the matte faces, was also inferior in an amount of the food modifier retained and releaseability of the food modifier. Presumably, this is due to the outer face of the paper layer being the matte face, which has allowed the synthetic resin on an outer side to penetrate into the paper layer, and has reduced a thickness of a liquid retentive portion of the paper layer. In addition, comparison between Example 23 and Comparative Example 6 reveals that the outer face of the paper layer being the gloss face improves a barrier function of the outer face of the paper layer, and increases releaseability of the food modifier toward the inner face.

INDUSTRIAL APPLICABILITY

As set forth in the foregoing, the fibrous casing of the present invention can be used as a packaging sheet for cooking involving transfer of a food modifier, etc. to a processed meat product and a processed foodstuff such as ham, sausage, cheese, and the like.

EXPLANATION OF THE REFERENCE SYMBOLS 1, 11 Fibrous casing
2, 12 Paper layer
2a, 12a Inner face
2b, 12b Outer face
3 Synthetic resin layer
4 Oxygen barrier resin layer
5 First water vapor barrier resin layer
6 Second water vapor barrier resin layer

The invention claimed is:

1. A paper material for fibrous casing to be used as a food packaging material in heat processing of a foodstuff, wherein:

the paper material is formed by papermaking using a pulp slurry;
a content of pulp in the paper material is no less than 50% by mass;
one face is a gloss face and another face is a matte face; and
the paper material is used as an innermost layer of the fibrous casing to be in contact with the foodstuff; and
as measured by Bristow's method with a contact time of 20 seconds,
an amount of water absorption of the gloss face is no less than 20 ml/m$^2$ and no greater than 40 ml/m$^2$; and
an amount of water absorption of the matte face is no less than 10 ml/m$^2$ and no greater than 35 ml/m$^2$, the amount of water absorption of the gloss face being greater than the amount of water absorption of the matte face.

2. A paper material for fibrous casing to be used as a food packaging material in heat processing of a foodstuff, wherein:
the paper material is formed by papermaking using a pulp slurry;
a content of pulp in the paper material is no less than 50% by mass;
one face is a gloss face and another face is a matte face; and
the paper material is used as an innermost layer of the fibrous casing to be in contact with the foodstuff; and
wherein an arithmetic average roughness Ra of the gloss face is no less than 0.5 µm and no greater than 3 µm, and an arithmetic average roughness Ra of the matte face is no less than 3 µm and no greater than 6 µm.

3. A paper material for fibrous casing to be used as a food packaging material in heat processing of a foodstuff, wherein:
the paper material is formed by papermaking using a pulp slurry;
a content of pulp in the paper material is no less than 50% by mass;
one face is a gloss face and another face is a matte face; and
the paper material is used as an innermost layer of the fibrous casing to be in contact with the foodstuff; and
an absolute value of a fiber orientation angle of the gloss face is no less than 0° and no greater than 3°; and
an absolute value of a fiber orientation angle of the matte face is no less than 0.5° and no greater than 4°,
the absolute value of the fiber orientation angle of the gloss face being smaller than the absolute value of the fiber orientation angle of the matte face.

4. A fibrous casing for use as a food packaging material in heat processing of a foodstuff, comprising:
a paper layer that is arranged as an innermost layer and formed from a paper material; and
a synthetic resin layer that is overlaid on an outer face of the paper layer, wherein
the paper material is the paper material for fibrous casing according to claim 1.

5. The fibrous casing according to claim 4, wherein the matte face of the paper material is arranged on an inner side.

6. The fibrous casing according to claim 4, wherein the gloss face of the paper material is arranged on an inner side.

7. The fibrous casing according to claim 4, wherein
the synthetic resin layer comprises an oxygen barrier resin layer having an oxygen barrier property and a water vapor barrier resin layer having a water vapor barrier property.

8. The fibrous casing according to claim 7, wherein a resin forming the oxygen barrier resin layer is nylon, and a resin forming the water vapor barrier resin layer is polyethylene.

9. The fibrous casing according to claim 8, wherein:
an innermost layer of the synthetic resin layer is the water vapor barrier resin layer; and
the synthetic resin layer is overlaid on the outer face of the paper layer by means of extrusion lamination of polyethylene, which forms the water vapor barrier resin layer as the innermost layer of the synthetic resin layer.

10. The fibrous casing according to claim 4, wherein
the paper layer comprises a food modifier with which the paper material has been impregnated, the food modifier comprising a colorant, a flavoring, or a combination thereof.

11. A fibrous casing for use as a food packaging material in heat processing of a foodstuff, comprising:
a paper layer that is arranged as an innermost layer and formed from a paper material; and
a synthetic resin layer that is overlaid on an outer face of the paper layer, wherein
the paper material is the paper material for fibrous casing according to claim 2.

12. The fibrous casing according to claim 11, wherein the matte face of the paper material is arranged on an inner side.

13. The fibrous casing according to claim 11, wherein the gloss face of the paper material is arranged on an inner side.

14. The fibrous casing according to claim 11, wherein
the synthetic resin layer comprises an oxygen barrier resin layer having an oxygen barrier property and a water vapor barrier resin layer having a water vapor barrier property.

15. The fibrous casing according to claim 14, wherein a resin forming the oxygen barrier resin layer is nylon, and a resin forming the water vapor barrier resin layer is polyethylene.

16. The fibrous casing according to claim 15, wherein:
an innermost layer of the synthetic resin layer is the water vapor barrier resin layer; and
the synthetic resin layer is overlaid on the outer face of the paper layer by means of extrusion lamination of polyethylene, which forms the water vapor barrier resin layer as the innermost layer of the synthetic resin layer.

17. The fibrous casing according to claim 11, wherein
the paper layer comprises a food modifier with which the paper material has been impregnated, the food modifier comprising a colorant, a flavoring, or a combination thereof.

18. A fibrous casing for use as a food packaging material in heat processing of a foodstuff, comprising:
a paper layer that is arranged as an innermost layer and formed from a paper material; and
a synthetic resin layer that is overlaid on an outer face of the paper layer, wherein
the paper material is the paper material for fibrous casing according to claim 3.

19. The fibrous casing according to claim 18, wherein the matte face of the paper material is arranged on an inner side.

20. The fibrous casing according to claim 18, wherein the gloss face of the paper material is arranged on an inner side.

* * * * *